United States Patent
Kim (10) Patent No.: US 7,308,284 B2
(45) Date of Patent: Dec. 11, 2007

(54) DIGITAL SIGNAL PROCESSING APPARATUS OF COMMUNICATION TERMINAL FOR ADAPTABLY TRANSMITTING VOICE DATA TO ALLOTTED UPLINK CHANNELS AND VOICE DATA TRANSMISSION METHOD THEREOF

(75) Inventor: Hoe-Won Kim, Seoul (KR)

(73) Assignee: Samsung Electronics Co., Ltd. (KR)

( * ) Notice: Subject to any disclaimer, the term of this patent is extended or adjusted under 35 U.S.C. 154(b) by 655 days.

(21) Appl. No.: 10/778,817

(22) Filed: Feb. 13, 2004

(65) Prior Publication Data
US 2004/0160940 A1    Aug. 19, 2004

(30) Foreign Application Priority Data
Feb. 13, 2003   (KR) .................. 10-2003-0008987

(51) Int. Cl.
 H04B 7/00 (2006.01)
 H04Q 7/20 (2006.01)
(52) U.S. Cl. ................ 455/552.1; 455/422.1; 455/517; 370/329; 370/465
(58) Field of Classification Search ......... 455/552, 455/553, 425, 426, 552.1, 422, 462.62, 517, 455/550, 575.1, 462; 370/465, 466, 467
See application file for complete search history.

(56) References Cited

U.S. PATENT DOCUMENTS

| | | | | | |
|---|---|---|---|---|---|
| 5,478,448 | A | * | 12/1995 | Schneider | ................ 205/554 |
| 6,006,105 | A | * | 12/1999 | Rostoker et al. | ......... 455/552.1 |
| 6,035,212 | A | * | 3/2000 | Rostoker et al. | ......... 455/552.1 |
| 6,571,212 | B1 | * | 5/2003 | Dent | ................ 704/270.1 |

* cited by examiner

Primary Examiner—Tony T. Nguyen
(74) Attorney, Agent, or Firm—The Farrell Law Firm (57) ABSTRACT

Disclosed is a digital signal processing apparatus of a communication terminal for adaptably transmitting voice data to allotted uplink channels and a voice data transmission method thereof. The digital signal processing apparatus comprises a plurality of speech coders for compressing the sampled voice data with each compression rate predetermined according to the number of packet channels capable of being allotted, a plurality of channel coders for channel-coding each set of voice data, compressed by each speech coder, according to respective predetermined codes, and a switching section, for outputting voice data which are compressed and channel-coded corresponding to the number of the allotted packet channels when packet channels are allotted.

8 Claims, 8 Drawing Sheets

DIGITAL SIGNAL PROCESSING APPARATUS OF COMMUNICATION TERMINAL FOR ADAPTABLY TRANSMITTING VOICE DATA TO ALLOTTED UPLINK CHANNELS AND VOICE DATA TRANSMISSION METHOD THEREOF

PRIORITY

This application claims priority to an application entitled "Digital Signal Processing Apparatus Of Communication Terminal For Adaptably Transmitting Voice Data To Allotted Up-link Channel And Voice Data Transmitting Method Thereof" filed in the Korean Industrial Property Office on Feb. 13, 2003 and assigned Serial No. 2003-8987, the contents of which is incorporated herein by reference.

BACKGROUND OF THE INVENTION

1. Field of the Invention

The present invention relates to a digital signal processing apparatus of a communication terminal and a voice data transmission method thereof, and more particularly to a digital signal processing apparatus of a communication terminal, which performs speech coding and channel coding for detected voice data corresponding to allotted packet channels, and inserts the coded voice data into pertinent packet channels to output the inserted voice data, and a voice data transmission method thereof.

2. Description of the Related Art

Mobile telephone technology supporting wireless data packet transmission includes GPRS (General Packet Digital Radio Service), GSM (Global System for Mobile) and so forth.

GPRS can allot dynamic uplink channels in a wireless network supporting packet link for wireless data packet transmission. However, the GSM supports only a circuit-switched call processing method in channel allotment for packet transmission.

That is, the GPRS can maximize the utilization efficiency of the channels by allotting real uplink channels only in the case where there exist data to be transmitted by a terminal. However, the GSM allots channels fixed by the circuit-switched system, so that it may insure channel stability, but reduces the utilization efficiency of channels.

In general, it is believed that stream-type data, such as voice data, is preferably operated by the circuit-switched call processing method for channel allotment, however, a number of studies have been made into supporting dynamic uplink channel allotment by the GPRS in a packet network because of the two following reasons.

One reason is to avoid duplicate investment in uplink channels caused by supporting simultaneously voice data and other data besides voice data in a packet network. The other reason is to maximize channel utilization efficiency by reusing idle channel regions in a case in which a user's voice doesn't exist in a voice call. That is, it is often the case that one user of two users listens while the other user speaks during a voice call, and then, if the idle channel is reused, it will be possible to greatly increase the utilization efficiency of the channels.

In a wireless data packet transmission method having dynamically allotted uplink channels, support for a voice call has two problems as follows. First, when an overload is suddenly generated in a network, it is difficult to provide assurance of the best channel allotment, and thus it is a problem that channel allotment is not stabilized. Secondly, the other problem is that delay time—which is generated through a serial process in which channel allotment is requested by a communication terminal, channels are allotted according to the channel allotment request and communication is performed by using the allotted channels—is suitable for such a communication as web browsing but is not suitable for stream-type communication such as a voice call. That is, a voice call demands that a system's delay time for channel allotment is minimized.

Figure 1:
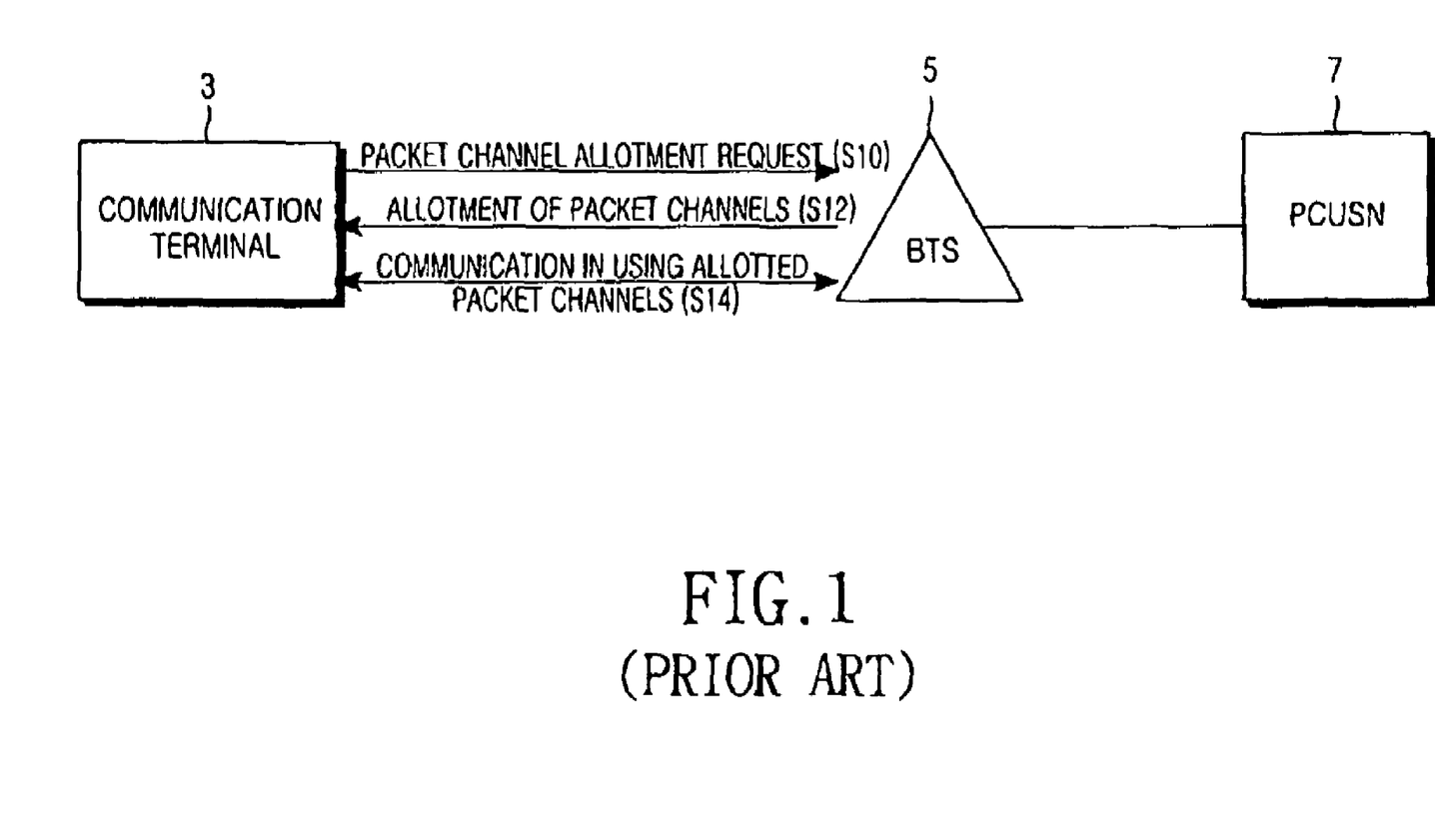
FIG. 1 is a schematic view illustrating an allotment process of packet channel in a network supporting transmission of wireless data packet.

FIG. 1 is a schematic view illustrating an allotment process of packet channels in a network supporting transmission of wireless data packets, such as GPRS. A network for wireless data packet transmission includes a communication terminal (hereinafter, referred to as "terminal") 3 performing communication through allotted packet channels, a BTS (Base station Transceiver Subsystem) 5 for relaying intercommunication between the terminal 3 and an outside communication apparatus, and a PCUSN (Packet Control Unit Supporting Node) 7 allotting packet channels dynamically to the terminal.

First, the terminal 3 requests allotment of packet channels while transmitting desired data traffic information and so forth to the BTS 5 on session connection (step S1). The BTS 5 transmits data traffic information transmitted from the terminal 3 to the PCUSN 7. The PCUSN 7 allots uplink packet channels (Step S12) for terminal 3 on the basis of received data traffic information and transmits allotted information through the BTS 5 (step S14). Therefore, the terminal 3 performs communication with outside communication apparatus by using the allotted packet channels.

Meanwhile, the PCUSN 7 may use one of many kinds of periods in order to allot the number of uplink channels, and especially a coding block maybe be used as a period. That is, the PCUSN 7 continuously provides the channel number and physical information to be used at the time of the next uplink to each down-link data block.

The PCUSN 7, which controls allotment of uplink packet channels, must also provide packet channel allotment services to many different communication apparatuses requesting allotment of packet channels. Therefore, the PCUSN 7 may be suddenly overloaded when communication apparatuses simultaneously request a large amount of uplink packet channel allotment, thus it is difficult to secure the best channel allotment requested by the communication apparatuses.

Also, if the PCUSN 7 allots packet channels according to signals requesting packet channel allotment and keeps a static state with the allotted packet channels, even if there is no voice data to be transmit by a terminal 3, it is impossible to reuse the packet channels, resulting in a reduction in the utilization of the channels.

On the other hand, when the PCUSN 7 allots fewer packet channels than requested by a terminal 3, the terminal 3 cannot transmit voice data within the transmission delay time required for transmitting voice data. That is, in a situation that a great number of channels for transmission, like for data calls, is needed, the terminal 3 cannot wait for a sufficient number of channels to be allotted later on, while enduring the data's transmission delay caused from insufficiency of the allotted channel number. In this case, some voice blocks cannot help but be destroyed in order to transmit data without errors, so that there is a problem of extreme reduction of speech quality.

SUMMARY OF THE INVENTION

Accordingly, the present invention has been made to solve the above-mentioned problems occurring in the prior art, and an object of the present invention is to provide a digital signal processing apparatus of a communication terminal for securing speech quality of at least a predetermined level even if the channel allotment corresponding to a channel allotment request is not ideally provided, and voice data transmission method by using the same.

Another object of the present invention is to provide a digital signal processing apparatus for adaptably transmitting voice data to allotted uplink channels and voice data transmission method by using the processor.

In order to accomplish these objects, there is provided a digital signal processing apparatus of a communication terminal performing digital signal processing of sampled voice data corresponding to the number of allotted packet channels in accordance with packet channel allotment requests and then performing wireless transmission, the digital signal processing apparatus comprising a plurality of speech coders for compressing the sampled voice data with each compression rate predetermined according to the number of packet channels capable of being allotted; a plurality of channel coders for channel-coding each set of voice data, compressed by each speech coder, according to respective predetermined codes; and a switching section, when packet channels are allotted, for outputting voice data which are compressed and channel-coded corresponding to the number of the allotted packet channels.

Preferably, the digital signal processing apparatus of a communication terminal according to the present invention further comprises a plurality of buffers, arranged in a one-to-one correspondence with the channel coders, for storing each set of voice data channel-coded through each channel coder and for outputting the stored voice data to the switching section according to the connection of the switching section.

Each of the channel coders channel-codes each set of voice data compressed through the speech coders by each channel code respectively predetermined corresponding to the numbers of packet channels capable of being allotted.

Also, the speech coders have different compression rates from one another and the predetermined compression rate corresponding to the largest number of packet channels capable of being allotted is the lowest. The channel coders have different channel codes from one another and the predetermined channel code corresponding to the largest number of packet channels capable of being allotted is the most complicated.

Meanwhile, in accordance with another aspect of the present invention, there is provided a digital signal processing apparatus of a communication terminal performing a digital signal processing of sampled voice data corresponding to the number of allotted packet channels in accordance with packet channel allotment request and then performing a wireless transmission, the digital signal processing apparatus comprising a first digital signal processing section for compressing and channel-coding the sampled voice data in accordance with a first compression rate and a first code predetermined corresponding to number of packet channels capable of being allotted; a second digital signal processing section for recompressing and channel-coding the voice data, which are compressed and channel-coded through the first digital signal processing section, in accordance with to a second compression rate and a second code predetermined corresponding to number of packet channels capable of being allotted; a third digital signal processing section for recompressing and channel-coding the voice data, which are recompressed and channel-coded through the second digital signal processing section, in accordance with to a third compression rate and a third code predetermined corresponding to number of packet channels capable of being allotted; and a switching section for outputting, when packet channels are allotted corresponding to a packet channel allotment request, voice data compressed and channel-coded corresponding to the number of the allotted packet channels among three kinds of voice data compressed and channel-coded at the first, second and third digital signal processing sections.

Preferably, the digital signal processing apparatus further comprises a first buffer for storing voice data compressed and channel-coded at the first digital signal processing section, and for outputting the stored voice data according to a switching connection of the switching section; a second buffer for storing voice data recompressed and channel-coded at the second digital signal processing section, and for outputting the stored voice data, which are recompressed and channel-coded by the second digital signal processing section, according to a switching connection of the switching section; and a third buffer for storing voice data recompressed and channel-coded at the third digital signal processing section, and for outputting the stored voice data, which are recompressed and channel-coded by the third digital signal processing section, according to a switching connection of the switching section.

Meanwhile, in accordance with another aspect of the present invention, there is provided a method for transmitting voice data using a digital signal processing apparatus of a communication terminal, the digital signal processing apparatus performing a digital signal processing of sampled voice data corresponding to the number of allotted packet channels in accordance with packet channel allotment requests and then performing wireless transmission, the method comprising the steps of compressing the sampled voice data with each compression rate predetermined respectively according to the number of packet channels capable of being allotted; channel-coding each compressed voice data according to each channel code which is predetermined; and outputting, when packet channels are allotted, voice data compressed and channel-coded corresponding to the number of the allotted packet channels, by a switching operation.

In accordance with the present invention, the digital signal processing apparatus, before the packet channels are allotted, performs compression and channel coding corresponding to the number of possible cases of packet channel allotment in advance, thus shortening the time required for compression and channel coding of voice data according to a packet channel allotment. Also, the digital signal processing apparatus performs multiple compressions and channel coding with voice data corresponding to the multiple possible cases of packet channel allotment in advance, and outputs the compressed and channel-coded voice data to the RF processing section by switching corresponding to allotted packet channels when packet channels are allotted, thus shortening the transmission delay time required for transmitting the voice data by adaptably inserting the voice data compressed and channel-coded into the allotted packet channels. Therefore, it is possible to achieve stable voice communication.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

Hereinafter, a digital signal processing apparatus of a communication terminal for adaptably transmitting voice data to allotted uplink channels and a voice data transmission method thereof according to preferred embodiments of the present invention will be described with reference to the accompanying drawings. It is to be noted that the same elements are indicated with the same reference numerals throughout the drawings. Although a number of specific features, such as specific components of a circuitry, are given below, they are only presented for a better understanding of the present invention. Also, it will be clear to those skilled in the art that the present invention can be practiced without such specific features. In the following description of the present invention, a detailed description of known functions and configurations incorporated herein will be omitted when it may obscure the subject matter of the present invention.

Figure 2:
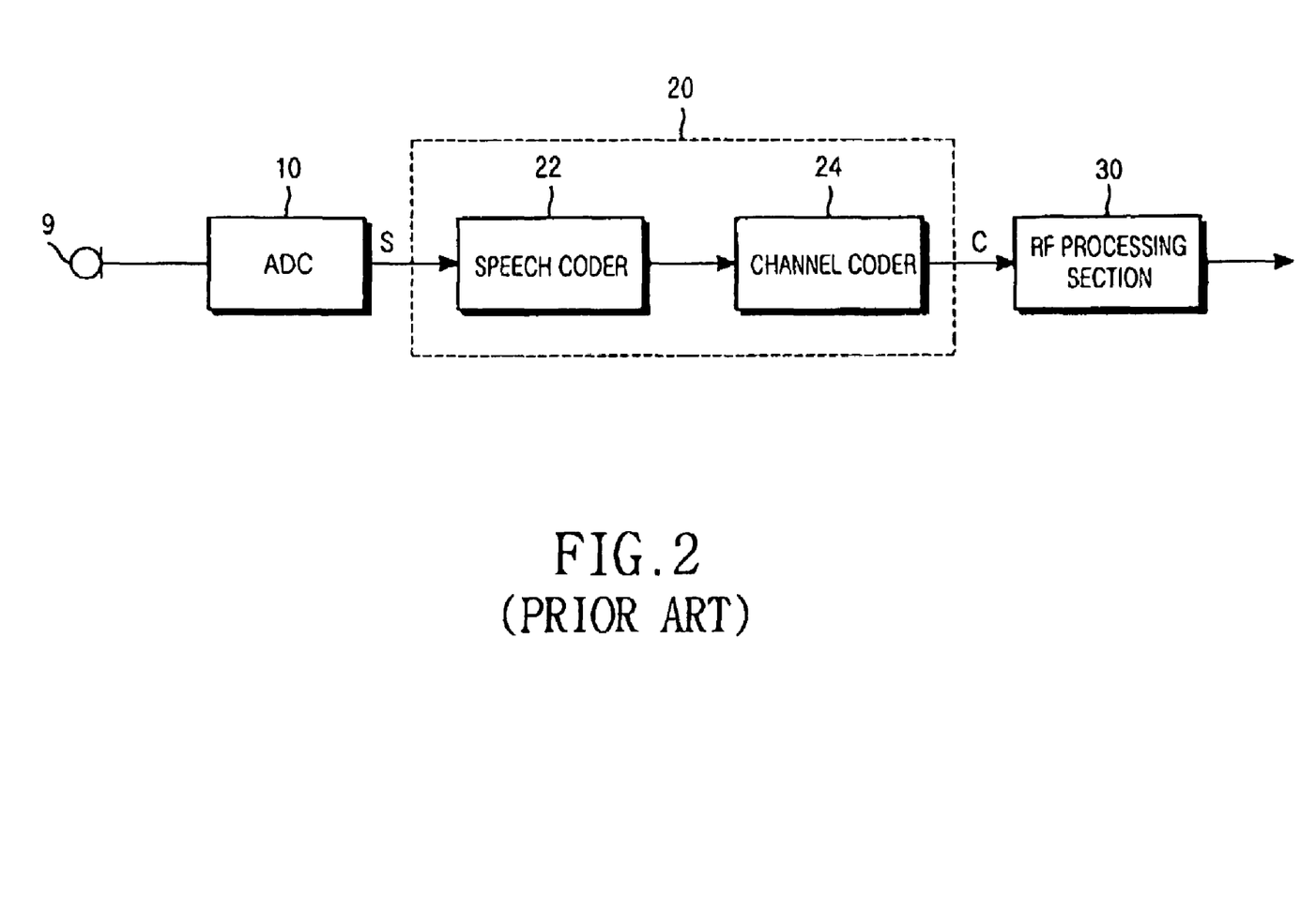
FIG. 2 is a block diagram illustrating a digital signal processing apparatus processing voice data in a general wireless communication terminal.

FIG. 2 is a block diagram illustrating a digital signal processing apparatus processing voice data in a general wireless communication terminal.

When detected voice data are inputted through a microphone 9, an ADC (Analog to Digital Converter) 10 performs a PCM (Pulse Code Modulation) sampling of analog voice signals inputted from the microphone 9 and converts the analog voice signals into digital data. The voice data (hereinafter, referred to as "sampled data") S sampled by the ADC 10 are inputted to a digital signal processing apparatus 20.

The digital signal processing apparatus 20 comprises a speech coder 22 and a channel coder 24. The speech coder 22 compresses the sampled data S through a variety of voice compression techniques according to a predetermined compression ratio. The quality of the compressed voice data is in inverse proportion to the compression ratio of voice data. When the channel coder 24 receives the compressed voice data transmitted from the speech coder 22, the channel coder 24 performs channel coding for error detection and correction of the received voice data.

The channel-coded voice data C are inputted to an RF processing section 30 which high-frequency amplifies the packet data and transmits the amplified packet data to a receiving side through an antenna (not shown).

The RF processing section 30 inserts the channel-coded voice data C into the allotted uplink channels (time slots) to output the channel-coded voice data for high-frequency-amplifying and transmission of the packet data.

Figure 3:
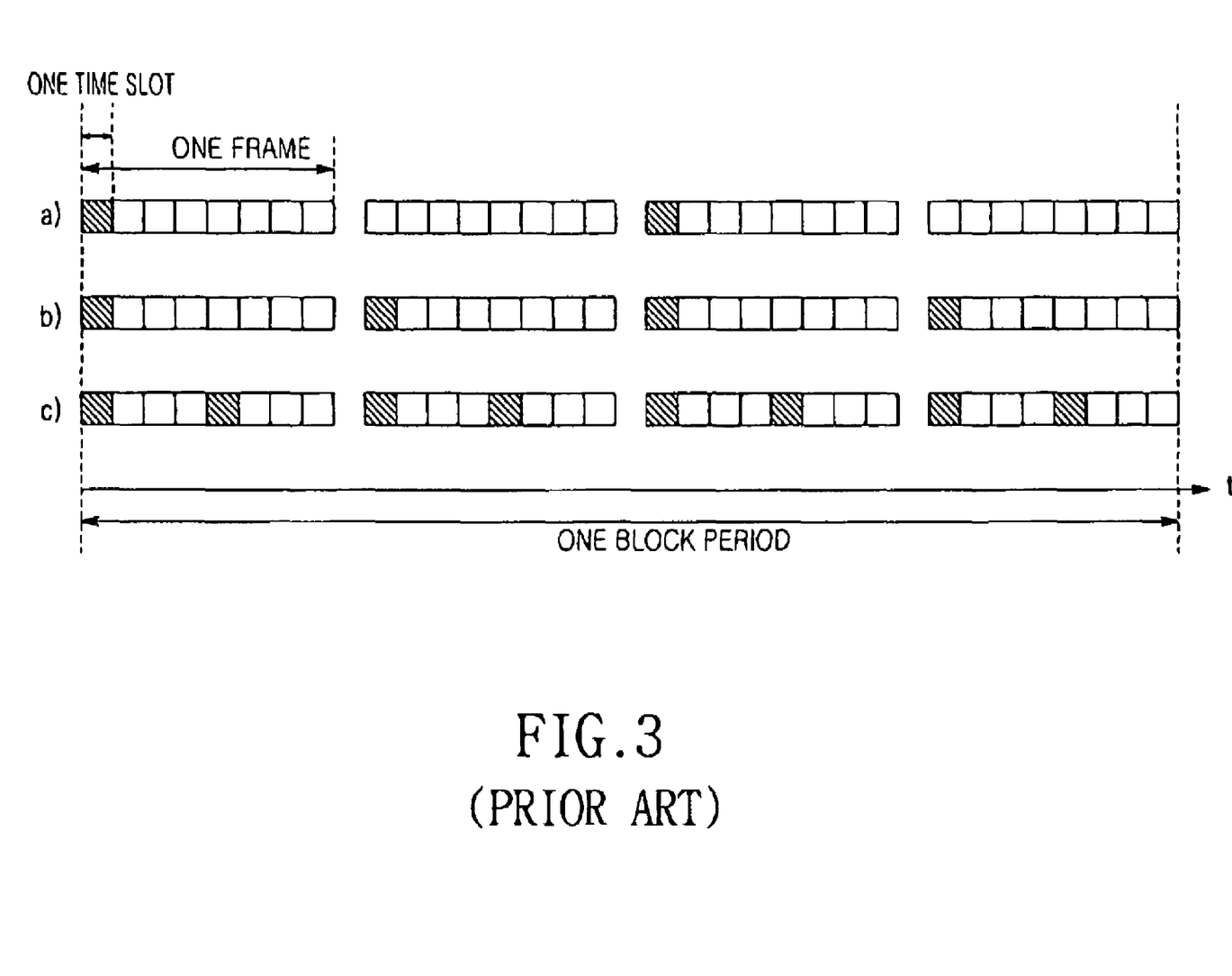
FIG. 3 is a view illustrating an example of uplink channels on the basis of time axis, which can be allotted for transmission of voice data during one block period.

FIG. 3 is a view illustrating an example of uplink channels on the basis of time axis, which can be allotted for transmission of voice data during one block period. Here, one block period represents permitted times to transmit a unit data block coded by voice data of a specific length. FIG. 3 shows that the main channel of one block period is divided into four frames according to the time axis, and one frame is divided into eight sub-channels or time slots.

The time slots can be classified according to the number of the time slots which are allotted during one block period, according to each communication circumstance. FIG. 3 shows that the number of time slots (packet channels) allotted during one block period by the PCUSN 7, corresponding to packet channel allotment requests of the terminal 3 for transmitting voice data in FIG. 1, are two at a), four at b) and eight at c).

For example, when the terminal 3 requests eight time slots (packet channels) such as at c) in FIG. 3 during one block period, the PCUSN 7 may allot four or two packet channels, fewer than the eight time slots, during one block period according to the communication circumstance in a communication network.

When packet channels allotted by the PCUSN 7 is received through the terminal 3, the speech coder 22 in FIG. 2 compresses the sampled voice data according to a predetermined compression ratio corresponding to the allotted packet channels. Then, if two packet channels per block period are allotted as shown in a) of FIG. 3, the speech coder 22 compresses the sampled voice data with a relative low compression ratio and the channel coder 24 performs channel coding of the compressed voice data with a relative high (complicated) coding rate. However, if eight packet channels per block period are allotted as shown in c) of FIG. 3, the speech coder 22 compresses the sampled voice data with a relative high compression ratio and the channel coder 24 performs channel coding of the compressed voice data with a relative low coding rate.

As described above, when the terminal 3 receives allotted packet channels, corresponding to packet channel allotment requests for transmitting voice data from the PCUSN 7, the terminal 3 compresses and codes the received voice data corresponding to the number of allotted packet channels, so that the concurrency requested for transmission of voice data may be relaxed. Thus, voice data transmission delay is caused, which makes voice communication quality not to be ensured at least to a predetermined level. Therefore, the present invention has been made to solve these problems.

Figure 4:
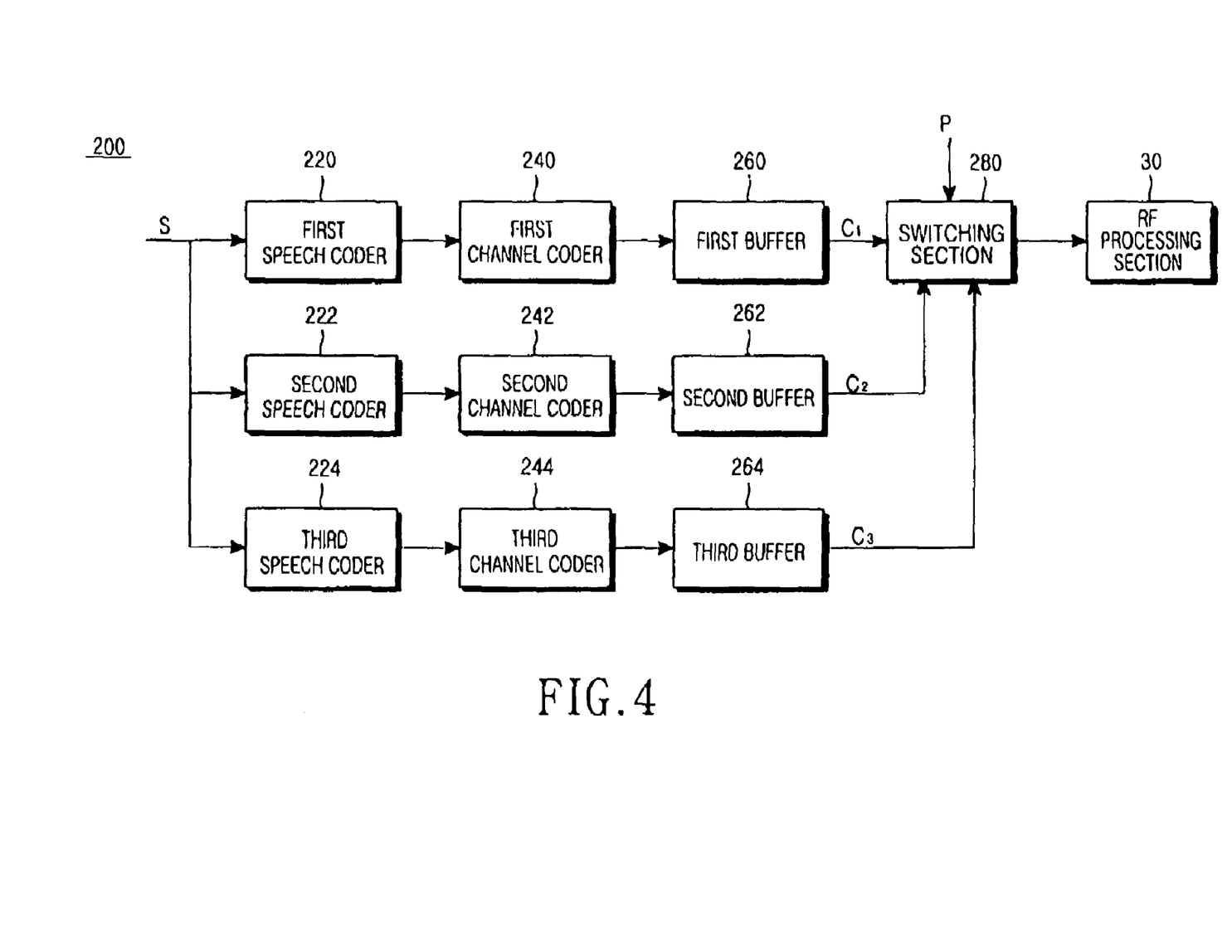
FIG. 4 is a block diagram illustrating a first embodiment of digital signal processing apparatus for adaptably transmitting voice data to allotted uplink channels according to an embodiment of the present invention.

FIG. 4 is a block diagram illustrating a first embodiment of digital signal processing apparatus for adaptably transmitting voice data to allotted uplink channels according to an embodiment of the present invention. In the following description, a digital signal processing apparatus will be described with the allotment examples of packet channels illustrated in FIG. 3.

As shown in FIG. 4, a digital signal processing apparatus 200 comprises a first speech coder 220, a second speech coder 222, a third speech coder 224, a first channel coder 240, a second channel coder 242, a third channel coder 244, a first buffer 260, a second buffer 262, a third buffer 264 and a switching section 280. Also shown is RF Processing Section 30.

The first, second and third speech coders 220, 222 and 224 compress the sampled voice data S according to predetermined compression rates in a state in which packet channels are not allotted by the PCUSN 7. The first, second and third speech coders 220, 222 and 224 have different predetermined compression rates from one another. Each compression rate according to an embodiment of the present invention is set so that the first, second and third speech coders 220, 222 and 224 may have compression rates which are each progressively lower than the previous one. That is, in the first, second and third speech coders 220, 222 and 224, the first speech coder 220 has the highest compression rate and the third speech coder 224 has the lowest compression rate.

In the embodiment, the first speech coder 220 has a predetermined compression rate for inserting voice data into two allotted packet channels in a situation in which two packet channels per one block period are allotted. Therefore, because the voice data compressed by the first speech coder 220 are inserted into only two time slots per one block period with a very high compression rate, the received voice quality of the voice data is reduced, but large amount of data can be transmitted.

The second speech coder 222 has a predetermined compression rate for inserting voice data into four allotted packet channels corresponding to a situation in which four packet channels per one block period are allotted. The third speech coder 224 has a predetermined compression rate for inserting voice data into eight allotted packet channels corresponding to a situation in which eight packet channels per one block period are allotted. Therefore, because the voice data compressed by the third speech coder 224 are inserted into eight time slots per one block period with a very low compression rate, the received voice quality of the voice data is better than the voice data compressed by the first speech coder 220, but only a small amount of data can be transmitted.

The first channel coder 240 performs channel coding of the voice data compressed by the first speech coder 220, according to a predetermined code corresponding to a situation in which there are two packet channels per one block period. The second channel coder 242 performs channel coding of the voice data compressed by the second speech coder 222, according to a predetermined code corresponding to a situation in which there are four packet channels per one block period. The third channel coder 244 performs channel coding of the voice data compressed by the third speech coder 224, according to a predetermined code corresponding to a situation in which there are eight packet channels per one block period. Then, the first, second and third channel coders 240, 242 and 244 each have different codes from one another. It is preferred that the codes of the first, second and third channel coders 240, 242 and 244 become progressively more complicated in progressive order of the first, second and third channel coders 240, 242 and 244.

Therefore, a receiving-side receiving voice data channel-coded by the third channel coder 244 can perform error detection and correction more exactly than voice data channel-coded by the first channel coder 240.

The first buffer 260 stores voice data channel-coded by the first channel coder 240, and outputs the stored voice data C1 when it is connected to the switching section 280. The second buffer 262 stores voice data channel-coded by the second channel coder 242, and outputs the stored voice data C2 when it is connected to the switching section 280. The third buffer 264 stores voice data channel-coded by the third channel coder 244, and outputs the stored voice data C3 when it is connected to the switching section 280.

When the switching section 280 receives allotted packet channels P from the PCUSN 7 shown in FIG. 1 corresponding to packet channel allotment request, the switching section 280 controls one of the first, second and third buffers 260, 262 and 264 so as to output stored voice data compressed and channel-coded corresponding to the received packet channels P. If the packet channels P inputted to the switching section 280 is 4 (P=4), the switching section 280 connects the switch to the second buffer 262, which stores voice data compressed and channel-coded by the second speech coder 222 and the second channel coder 242 corresponding to the case that four packet channels per one block period are allotted, so as to output the stored voice data $C_2$. The voice data outputted from the second buffer 262 is input into the RF processing section 30 through the switching section 280. The RF processing section 30 inserts voice data outputted from the switching section 280 into each allotted time slot (packet channel), and transmits the inserted voice data to a receiving-side through an antenna (not shown).

As described above, before the packet channels are allotted, the digital signal processing apparatus performs in advance, multiple compressions and channel codings on the sampled voice data S corresponding to several situations in which packet channels are capable of being allotted for transmission, thus shortening the time required for compression and channel coding of voice data according to a packet channel allotment. Also, the digital signal processing apparatus performs in advance, multiple compressions and channel codings on the sampled voice data S corresponding to the multiple possible cases of packet channel allotment, and outputs the compressed and channel-coded voice data to the RF processing section 30 by a switching operation corresponding to allotted packet channels when packet channels are allotted, thus shortening the transmission delay time required for transmitting the voice data by inserting the voice data compressed and channel-coded into the allotted packet channels. Therefore, voice communication can be more stabilized by shortening the transmission delay time required for transmission of the voice data as above.

Figure 5:
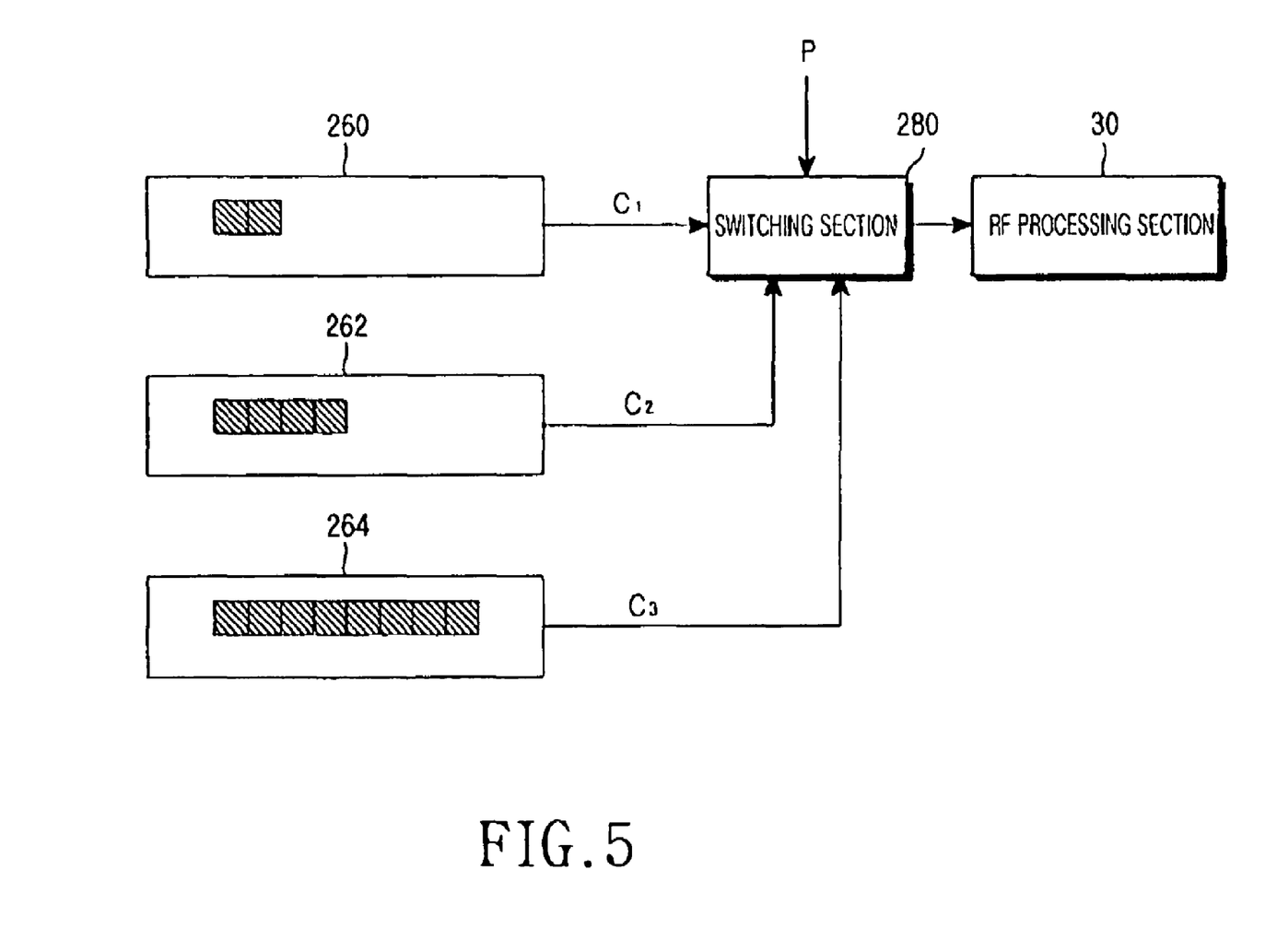
FIG. 5 is a view illustrating voice data being stored in a first, a second and a third buffers with time notion.

FIG. 5 is a view illustrating voice data being stored respectively in a first, a second and a third buffer 260, 262 and 264 with time notion. As illustrated in FIG. 5, the first buffer 260 stores voice data compressed and channel-coded so as to insert voice data, which are inputted from the first speech coder 220, into two time slots during one block period. The second buffer 262 stores voice data compressed and channel-coded so as to insert voice data, which are inputted from the second speech coder 222, into four time slots during one block period. The third buffer 264 stores voice data compressed and channel-coded so as to insert voice data, which are inputted from the third speech coder 224, into eight time slots during one block period. The voice data stored in the first buffer 260 has a much higher compression rate than the voice data stored in the third buffer 264.

Figure 6:
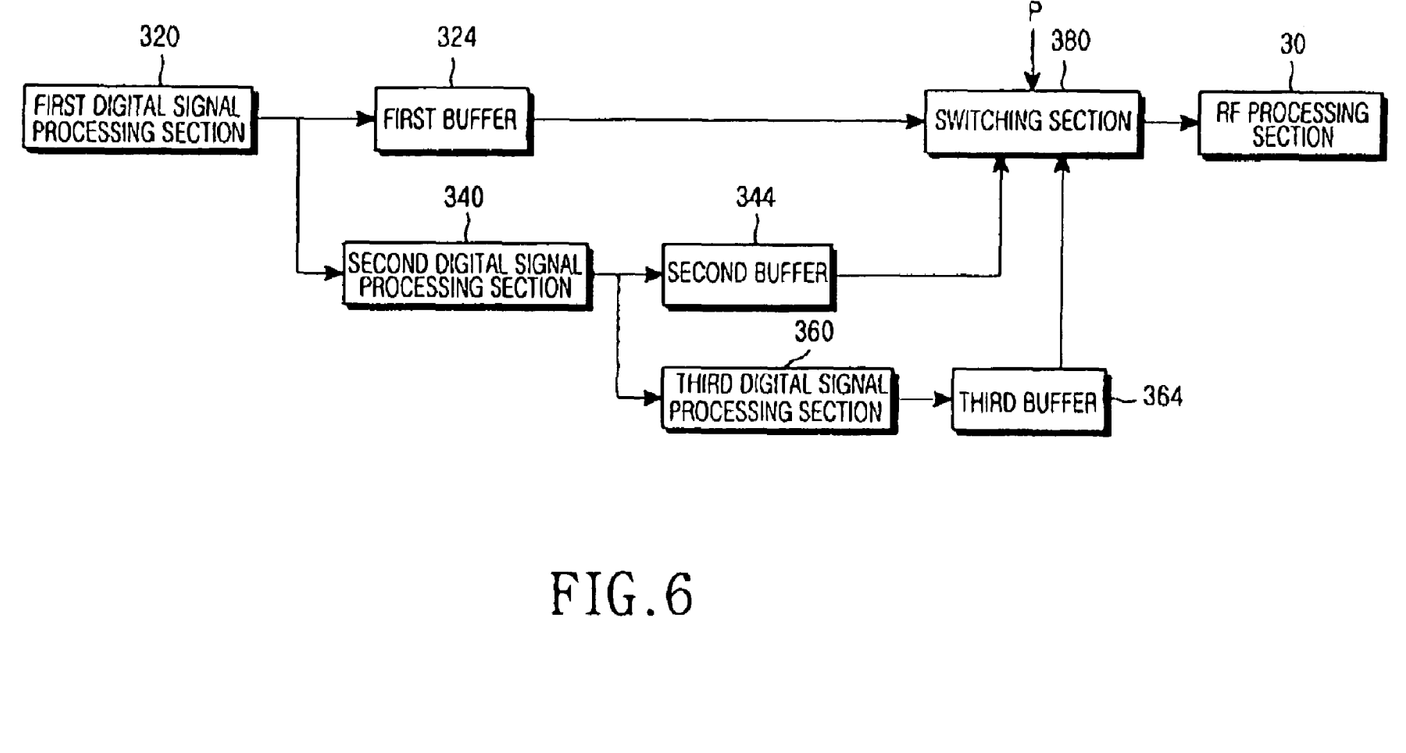
FIG. 6 is a block diagram illustrating a second embodiment of digital signal processing apparatus for adaptably transmitting voice data to allotted uplink channels according to an embodiment of the present invention.

FIG. 6 is a block diagram illustrating a second embodiment of digital signal processing apparatus for adaptably transmitting voice data to allotted uplink channels according to the present invention.

As illustrated in FIG. 6, the digital signal processing apparatus includes a first digital signal processing section 320, a first buffer 324, a second digital signal processing section 340, a second buffer 344, a third digital signal processing section 360, a third buffer 364, a switching section 380, and an RF Processing section 30.

The first digital signal processing section 320 performs speech coding and channel coding, the speech coding compresses sampled voice data according to a predetermined compression rate, and the channel coding codes the compressed voice data according to a predetermined code. The first buffer 324 stores voice data compressed and channel-coded by the first digital signal processing section 320, and outputs the stored voice data when it is connected to the switching section 380.

The second digital signal processing section 340 performs speech coding and channel coding, the speech coding recompresses the voice data compressed and channel coded by the first digital signal processing section 320 according to a predetermined compression rate, the channel coding codes the recompressed voice data according to a predetermined code. The second buffer 344 stores voice data recompressed and channel-coded by the second digital signal processing section 340, and outputs the stored voice data when it is connected to the switching section 380.

The third digital signal processing section 360 performs speech coding and channel coding, wherein the speech coding process recompresses the voice data recompressed and channel coded by the second digital signal processing section 340, according to a predetermined compression rate, and the channel coding process codes the recompressed voice data according to a predetermined code. The third buffer 364 stores voice data recompressed and channel-coded by the third digital signal processing section 360 and outputs the stored voice data when it is connected to the switching section 380.

The voice data compressed and channel-coded by the first digital signal processing section 320 is compressed with a lower compression rate and coded more simply than the voice data compressed and channel-coded by the third digital signal processing section 360. Therefore, it is possible to obtain a high compression rate through recompression being repeated, even with the second and third digital signal processing sections 340 and 360 having low compression rates.

According to the second embodiment, the first digital signal processing section 320 compresses and channel-codes inputted voice data, so that the inputted voice data are inserted into eight time slots per one block period (P=8). The second digital signal processing section 340 compresses and channel-codes the voice data compressed and channel-coded by the first digital signal processing section 320, so that the inputted voice data are inserted into four time slots per one block period (P=4). The third digital signal processing section 360 compresses and channel-codes the voice data compressed and channel-coded by the second digital signal processing section 340, so that the inputted voice data are inserted into two time slots per one block period (P=2).

When the switching section 380 receives the number information P of allotted packet channels from the PCUSN 7 shown in FIG. 1 corresponding to packet channel allotment request, the switching section 380 switches on one of the first, second and third buffers 324, 344 and 364 so as to output stored voice data compressed and channel-coded corresponding to the received number information P of packet channels. If the packet channels P inputted to the switching section 380 is 4 (P=4), the switching section 380 switches on the second buffer 344, which stores voice data compressed and channel-coded by the second digital signal processing section 340 corresponding to a situation in which four packet channels per one block period are allotted, so as to output the stored voice data. The voice data outputted from the second buffer 344 is input to the RF processing section 30 through the switching section 380. The RF processing section 30 inserts voice data outputted from the switching section 380 into each allotted time slot (packet channel), and transmits the inserted voice data to a receiving-side through an antenna (not shown).

As described above, the digital signal processing apparatus, before the packet channels are allotted, performs in advance, multiple compressions and channel coding with the inputted voice data corresponding to the possible multiple cases of packet channel allotment, thus shortening the time required for compression and channel coding of voice data according to a packet channel allotment.

Also, the digital signal processing apparatus have the construction that multiple digital signal processing sections are serially arranged and each digital signal processing section recompresses and channel-codes the voice data compressed and channel-coded in the previous part of the pertinent digital signal processing section, thus reducing operation overhead being caused when multiple digital signal processing sections are arranged in parallel.

Figure 7:
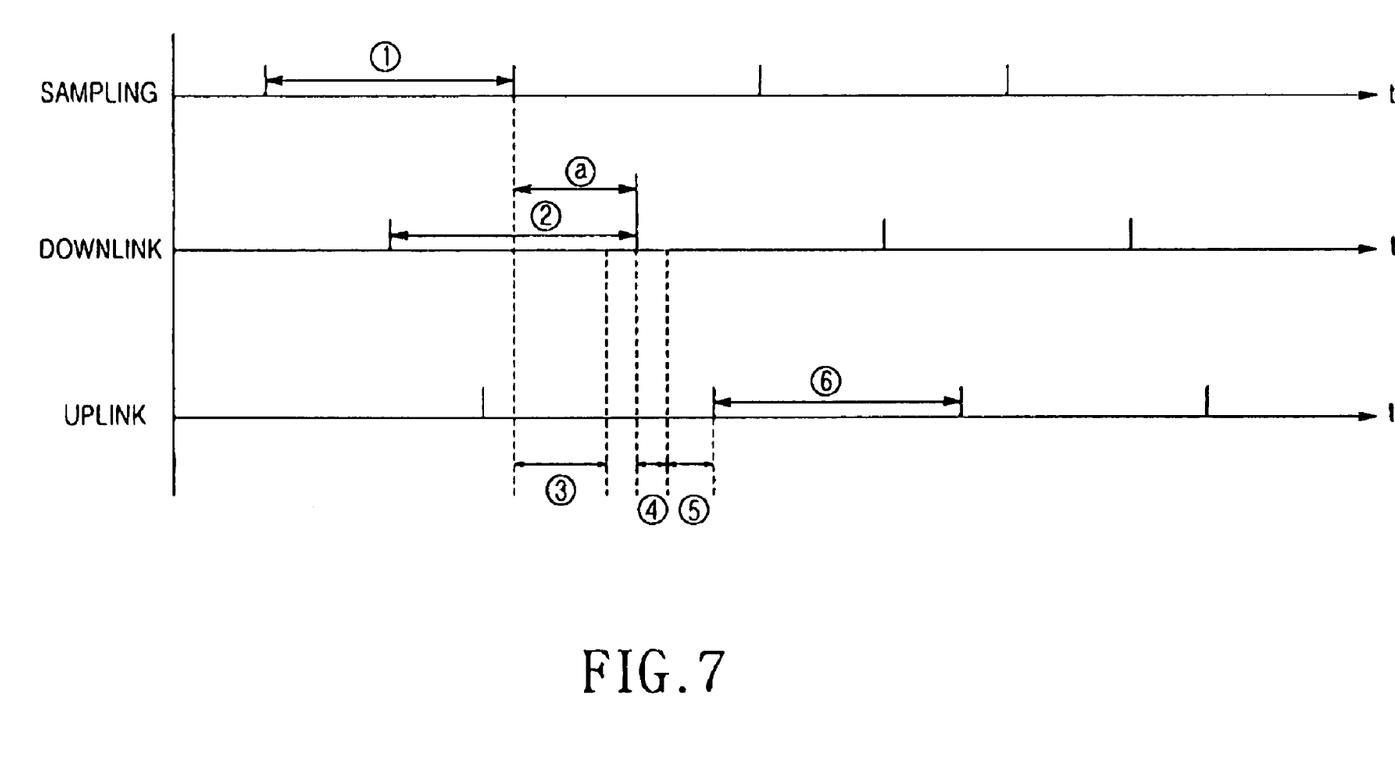
FIG. 7 is a graph for describing a shortening effect upon the time required for transmitting voice data in accordance with an embodiment of the present invention.

FIG. 7 is a graph for describing a shortening effect upon the time required to transmit voice data in accordance with the present invention. The graph shows the time required until voice data are transmitted, on the basis of time axis.

Referring to FIG. 7, reference number ① represents a time required for sampling voice data at the ADS 10 in FIG. 2. Reference number ② represents time required for receiving packet channels allotted from the PCUSN 7 corresponding to packet channel allotment requested from the communication terminal. That is, the reference number ② represents time required for downlink of packet channels allotted from the PCUSN 7 at the communication terminal having requested allotment of packet channels.

Reference number ③ represents time required for compressing and channel-coding voice data at the speech coders 220, 222 and 224 and the channel coders 240, 242 and 244 according to the embodiment of the present invention. Then, the speech coders 220, 222 and 224 and the channel coders 240, 242 and 244 compresses and channel-codes the voice data during the time of reference number ③ within the time of reference ② required for receiving the packet channels allotted from the PCUSN 7 at the communication terminal. That is, the downlink for receiving allotted packet channels and the compression/channel-coding of voice data are performed within the same time range according to the embodiment of the present invention.

On the contrary, if the time compressing/channel-coding voice data proceeds after the time ② receiving the allotted packet channels proceeds and then a calculation of the number of allotted packet channels is completed by decoding received packet channels, there is a problem in that speech quality is degraded by transmission time delay of the voice data.

Reference number ④ represents time required for decoding packet channels in order to check the number of the packet channels (time slots) being down-linked. The number of the decoded packet channels is the number of time slots allotted for inserting the compressed and channel-coded voice data per one block period. Therefore, the number of the decoded packet channels is inputted to the switching section 280 or 380.

Reference number ⑤ represents time required, from when the switching section 280 or 380 switches on one of the buffers 260, 262, 264, 324, 344 and 346 according to the inputted packet channel number so as to output the stored voice data having been compressed and channel-coded corresponding to the number of the decoded packet channels, to when the outputted voice data through the switching section 280 or 380 are inputted to the RF processing section 30.

Reference number ⑥ represents a time required for inserting the voice data into the allotted time slots at the RF processing section 30 and then for transmitting the inserted voice data with packet data through an antenna.

According to the embodiment, a delay time TT of voice data process for transmitting the voice data may be represented by Equation 1.

$$\text{Delay time } (TT) = \{\text{sampling time ① +a part of downlink time of allotted packet channels } a + \text{decoding time of packet channels ④ +selection and output time of stored voice data ⑤}\} \quad \text{Equation 1}$$

That is, the processing time for transmitting voice data according to the embodiment does not require a separate time ③ for compressing and channel-coding voice data. Therefore, the digital signal processing apparatus according to the present invention can shorten the time required for transmitting voice data as much as the time ③ for compression and channel-coding.

Meanwhile, if the operation for digital signal processing of voice data is performed after allotted packet channels is received like prior art, a delay time TP required for processing voice data so as to transmit the voice data may be represented by Equation 2.

$$\text{Delay time } (TP) = \{\text{sampling time ① +a part of downlink time of allotted packet channels ⓐ +decoding time of packet channels ④ +time for compressing and channel-coding voice data corresponding to the decoded packet channels ③ +output time of voice data compressed and channel-coded ⑤}\} \quad \text{Equation 2}$$

As shown in Equation 2, if digital signal processing of voice data is performed after allotted packet channels is received, the digital signal processing apparatus have a time delay as much as the time ③ required for compressing and channel-coding voice data per one block period.

That is, the present invention has an effect in that the digital signal processing apparatus can shorten the delay time as much as the time ③ required for compressing and channel-coding voice data per one block period, as compared with the prior art, on data processing for transmitting voice data.

Figure 8:
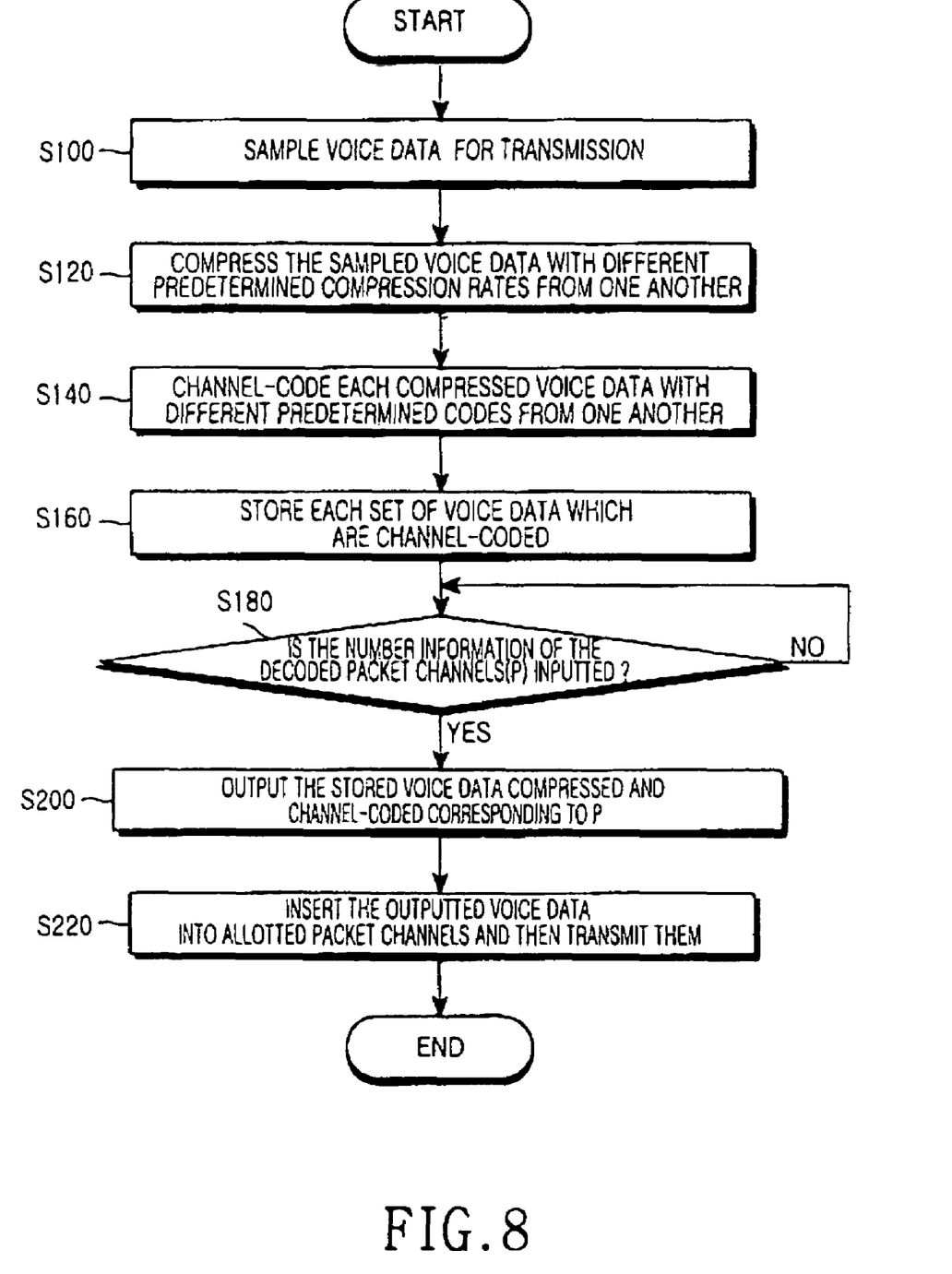
FIG. 8 is a flowchart illustrating a preferred embodiment of voice data transmission method using a digital signal processing apparatus according to an embodiment of the present invention.

FIG. 8 is a flowchart illustrating a preferred embodiment of voice data transmission method using a digital signal processing apparatus according to an embodiment of the present invention. First, the ADC 10 samples detected analog type of voice data so as to transmit the voice detected through microphone 9 (step S100).

The speech coders 220, 222 and 224 each compress the sampled voice data with different predetermined compression rates from one another (step S120). Then the different predetermined compression rates are set corresponding to the number of the packet channels capable of being allotted. The channel coders 240, 242 and 244 channel-code respectively each compressed voice data with different predetermined codes from one another (step S140).

The buffers 260, 262 and 264 respectively store each set of voice data channel-coded through each channel coder 240, 242 and 244 (step S160). The switching section 280 checks whether or not allotted packet channels is decoded and the number information of the decoded packet channels is inputted (step S180). If at step S180 it is determined that the number information of the decoded packet channels is inputted, the switching section 280 switches on one of the buffers 260, 262 and 264 so as to output the stored voice data compressed and channel-coded corresponding to the number information of inputted packet channels (step S200). Then, the voice data outputted from one of the buffers 260, 262 and 264 are inputted to RF processing section 30 through the switching section 280.

Then, the RF processing section 30 inserts the compressed and channel-coded voice data inputted through switching section 280 the packet channels allotted per one block period, and then transmits the inserted voice data to a receiving-side (step S220).

Therefore, the digital signal processing apparatus according to the present invention, before the packet channels for transmitting voice data are allotted, performs in advance, compression and channel coding with the voice data corresponding to the possible multiple cases of packet channel allotments, so that the digital signal processing apparatus can transmit voice data faster than a digital signal processing apparatus according to the prior art.

In the description of the present invention, packet channel, time slot, and sub-channel are used together, actually, the packet channel, time slot and sub-channel are used for the same function.

In accordance with the present invention, the digital signal processing apparatus, before the packet channels are allotted, performs in advance, compression and channel coding corresponding to the number of the possible cases of packet channel allotment, thus shortening the time required for compression and channel coding of voice data according to a packet channel allotment.

Also, the digital signal processing apparatus performs in advance, multiple compressions and channel coding with voice data corresponding to the multiple possible cases of packet channel allotment, and outputs the compressed and channel-coded voice data to the RF processing section by switching corresponding to allotted packet channels when packet channels are allotted, thus shortening the transmission delay time required for transmitting the voice data by adaptably inserting the voice data compressed and channel-coded into the allotted packet channels. Therefore, it is possible to achieve stable voice communication.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A digital signal processing apparatus of a communication terminal performing digital signal processing of sampled voice data corresponding to the number of allotted packet channels in accordance with packet channel allotment requests and performing wireless transmission, the digital signal processing apparatus comprising:

a plurality of speech coders for compressing the sampled voice data at predetermined compression rates according to the number of packet channels capable of being allotted;

a plurality of channel coders for channel-coding each set of voice data, compressed by each speech coder, according to respective predetermined codes; and a switching section for outputting when packet channels are allotted, compressed and channel-coded voice data corresponding to the number of the allotted packet channels.

2. A digital signal processing apparatus of a communication terminal as claimed in claim 1, wherein the digital signal processing apparatus further comprises a plurality of buffers, arranged in a one-to-one correspondence with the channel coders, for storing each set of voice data channel-coded through each channel coder and for outputting the stored voice data to the switching section when the switching section is connected to a buffer.

3. A digital signal processing apparatus of a communication terminal as claimed in claim 1, wherein each channel coder channel-codes each set of voice data according to the number of packet channels capable of being allotted.

4. A digital signal processing apparatus of a communication terminal as claimed in claim 1, wherein the speech coders have different compression rates from one another and the compression rate corresponding to the largest number of packet channels capable of being allotted is the lowest.

5. A digital signal processing apparatus of a communication terminal as claimed in claim 1, wherein the channel coders have different channel codes from one another and the channel code corresponding to the largest number of packet channels capable of being allotted is the most complicated.

6. A digital signal processing apparatus of a communication a terminal performing digital signal processing of sampled voice data corresponding to the number of allotted packet channels in accordance with packet channel allotment requests and performing wireless transmission, the digital signal processing apparatus comprising:

a first digital signal processing section for compressing and channel-coding the sampled voice data in accordance with a first compression rate and a first code which are predetermined and correspond to a number of packet channels capable of being allotted;

a second digital signal processing section for recompressing and channel-coding, in accordance with to a second compression rate and a second code which are predetermined and correspond to the number of packet channels capable of being allotted, the voice data compressed and channel-coded through the first digital signal processing section;

a third digital signal processing section for recompressing and channel-coding, in accordance with to a third compression rate and a third code which are predetermined and correspond to the number of packet channels capable of being allotted, the voice data recompressed and channel-coded through the second digital signal processing section; and a switching section for outputting when packet channels are allotted corresponding to a packet channel allotment request voice data compressed and channel-coded corresponding to the number of the allotted packet channels among the voice data compressed and channel-coded at the first, second and third digital signal processing sections.

7. A digital signal processing apparatus of a communication terminal as claimed in claim 6, further comprising:

a first buffer for storing voice data compressed and channel-coded at the first digital signal processing section, and for outputting the stored voice data according to a switching connection of the switching section;

a second buffer for storing voice data recompressed and channel-coded at the second digital signal processing section, and for outputting the stored voice data according to a switching connection of the switching section; and a third buffer for storing voice data recompressed and channel-coded at the third digital signal processing section, and for outputting the stored voice data, which are recompressed and channel-coded by the third digital signal processing section, according to a switching connection of the switching section.

8. A method for transmitting voice data using a digital signal processing apparatus of a communication terminal, the digital signal processing apparatus performing digital signal processing of sampled voice data corresponding to the number of allotted packet channels in accordance with packet channel allotment requests and performing wireless transmission, the method comprising the steps of:

compressing the sampled voice data at predetermined compression rates according to the number of packet channels capable of being allotted;

channel-coding according to each predetermined channel code voice data; and outputting, according to a switching operation when packet channels are allotted, voice data compressed and channel-coded corresponding to the number of the allotted packet channels.

* * * * *